US 6,389,569 B1

(12) United States Patent
Chung et al.

(10) Patent No.: US 6,389,569 B1
(45) Date of Patent: May 14, 2002

(54) RECORDING MEDIUM FOR STORING REAL TIME RECORDING/REPRODUCTION INFORMATION, METHOD AND APPARATUS FOR RECORDING AND REPRODUCING IN REAL TIME, AND FILE OPERATING METHOD USING THE SAME

(75) Inventors: Hyun-kwon Chung, Kwangju-gun; Jung-wan Ko, Yongin; Byung-jun Kim, Suwon; Young-yoon Kim, Seoul; Do-nam Lee, Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/304,279

(22) Filed: May 3, 1999

(30) Foreign Application Priority Data

| May 1, 1998 | (KR) | ............................................. 98-15769 |
| Jul. 7, 1998 | (KR) | ............................................. 98-27308 |
| Jul. 27, 1998 | (KR) | ............................................. 98-30218 |
| Oct. 2, 1998 | (KR) | ............................................. 98-41764 |
| Dec. 15, 1998 | (KR) | ............................................. 98-55039 |

(51) Int. Cl.[7] ........................... G11C 29/00; G11B 20/18
(52) U.S. Cl. ................................................. 714/763
(58) Field of Search ..................... 360/55, 6.2; 386/128, 386/70, 95, 125; 714/763

(56) References Cited

U.S. PATENT DOCUMENTS

| 5,913,010 A | * | 6/1999 | Kaneshige et al. ............ 386/70 |
| 6,219,311 B1 | | 4/2001 | Mitsuno .................. 369/30.23 |
| 6,292,625 B1 | * | 9/2001 | Gotoh et al. ................... 386/95 |

FOREIGN PATENT DOCUMENTS

| EP | 469 832 A2 | 2/1992 |
| EP | 0664506 A2 | 7/1995 |
| EP | 0 838 926 A2 | 4/1998 |
| EP | 0 903 744 A2 | 3/1999 |
| EP | 1065665 A1 | 1/2001 |
| WO | WO 97/01841 | 1/1997 |
| WO | WO 99/13469 | 3/1999 |

OTHER PUBLICATIONS

McMurdie et al., Packet writing & UDF CD recording's logical next step, EMedia Professional, pp. 1–8, May, 1997.*
Optical Storage Technology Association (OSTA): "Universal Disk Format Specification, OSTA–2, Revision 2.00" (the whole document).

(List continued on next page.)

Primary Examiner—Albert Decady
Assistant Examiner—Shelly A Chase
(74) Attorney, Agent, or Firm—Staas & Halsey LLP

(57) ABSTRACT

A recording medium for storing real time recording/reproduction information, a real time recording and reproducing method and apparatus, and a file operating method using the information. Real time recording/reproduction information for ensuring real time recording/reproduction is stored in a file control information area, in each real time file, or in a separate file, and real time recording/reproduction attributes are assigned to the file. Thus, real time recorded files can be continuously reproduced without interruption. Also, there are methods of creating a file to which real time recording/reproduction attributes are assigned, extending a data area, and recording and reproducing the file to which real time recording/reproduction attributes are assigned.

35 Claims, 11 Drawing Sheets

OTHER PUBLICATIONS

Yu C et al.: "Efficient Placement of Audio Data on Optical Disks for Real–Time Applications" Communications of the Association for Computing Machinery, vol. 32, No. 7, Jul. 1, 1989, pp. 862–871.

Yu, Clement, et al., "Efficient Placement of Audio Data on Optical Disks for Real–Time Applications", Communications of the ACM, vol. 32, No. 7, (Jul. 1, 1989), pp. 862–871.

PSTA XP–002113791, Optical Storage Technology Association Technical Information, Universal Disk Format Specification, Rev. 2.0 (Apr. 1998), pp. 1–125. Duplicate.

U.S. application No. 09/901,115, Chung et al., filed Jul. 10, 2001.

U.S. application No. 09/576,973, Chung et al., filed May 24, 2000.

U.S. application No. 09/576,974, Chung et al., filed May 24, 2000.

U.S. application No. 09/577,042, Chung et al. filed May 24, 2000.

* cited by examiner

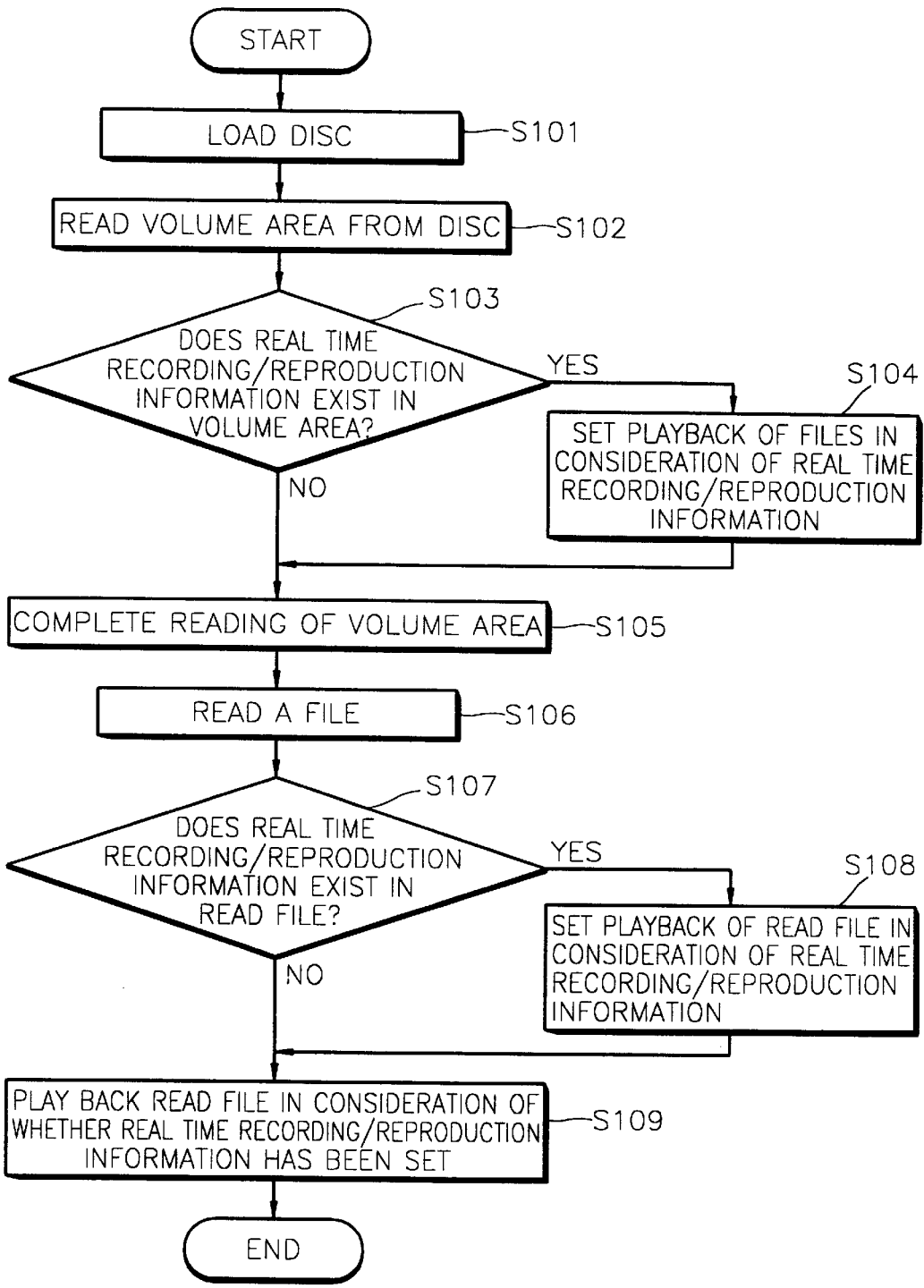

SetFilePointer(FileHandle, 8x1024x1024, NULL, FILE_END)
SetFileBitrate(FileHandle, bitrate)

RECORDING MEDIUM FOR STORING REAL TIME RECORDING/REPRODUCTION INFORMATION, METHOD AND APPARATUS FOR RECORDING AND REPRODUCING IN REAL TIME, AND FILE OPERATING METHOD USING THE SAME

CROSS-REFERENCE TO RELATED APPLICATIONS

This application claims the benefit of Korean Application Nos. 98-15769, filed May 1, 1998; 98-27308, filed Jul. 7, 1998; 98-30218, filed Jul. 27, 1998; 98-41764, filed Oct. 2, 1998; and 98-55039, filed Dec. 15, 1998 in the Korean Patent Office, the disclosures of which are incorporated herein by reference.

BACKGROUND OF THE INVENTION

1. Field of the Invention

The present invention relates to a system requiring recording and/or reproduction in real time, and more particularly, to a recording medium for storing real time recording/reproduction information, a method and apparatus for recording and reproducing a real time file based on the real time recording/reproduction information, and a file operating method using the real time recording/reproduction information.

2. Description of the Related Art

In a computer or audio and/or video (A/V) apparatus constituted of a file system for an A/V file required to be recorded/reproduced in real time, control information representing that the A/V file is a real time recording/reproduction file is not recorded in file control information. Thus, it is impossible to reproduce in real time a file comprised of data blocks physically scattered on a recording medium even if they are logically successive.

Here, a conventional file system, as shown in FIG. 1, is comprised of file control information having the length of a file, information on the position of file data, information on the possibility or impossibility of reading/writing a file, etc., and file data stored in positions designated by the file control information. When a file on a disc is read, file control information is first read, and file data in the positions designated by the read file control information is then read and reproduced. Such a method of allocating a block of a fixed size used in the conventional file system cannot guarantee real time reproduction of a file.

That is, recording/reproduction of the conventional file system is described by taking as an example the case in which two files occupy blocks on a disc as shown in FIG. 2. Here, a file A, requiring real time reproduction, occupies blocks 0, 3, 5 and 6 of the disc, and a file B, a general file, occupies blocks 1, 2, 4 and 7 of the disc.

The process for reproducing the file A is as follows.

In the first step, block 0 is read. In the second step, block 3 is searched for. In the third step, block 3 is read and played back. In the fourth step, the block 5 is searched for. In the fifth step, blocks 5 and 6 are read and played back. In the conventional file system, since information associated with real time recording/reproduction is not recorded even when recording a file requiring real time recording/reproduction, a data arrangement for real time recording/reproduction is not considered. Thus, real time reproduction may not be achieved.

That is, the file A (for example, a video file) of FIG. 2 requires real time reproduction, but the conventional file system arranges data files without consideration of the requirement of real time reproduction, thus causing a screen to be interrupted during playback. In order to record/reproduce files in real time, the sum of a seek time and a read time must be smaller than a playback time, as shown in the following expression:

$$\text{seek time} + \text{read time} < \text{playback time} \qquad (1)$$

In order to prevent a screen from being interrupted, a next block must be searched for during reading and reproducing a current block before the next block is read. However, in an apparatus for driving a disc such as a compact disc (CD) and a digital versatile disc (DVD), the seek time is significantly longer than the read time. Therefore, real time reproduction is impossible if the next block is not physically adjacent to the current block.

SUMMARY OF THE INVENTION

To solve the above problems, it is an object of the present invention to provide a recording medium for storing real time recording/reproduction information for real time files.

It is another object of the present invention to provide a method of recording real time recording/reproduction information after real time files are arranged in a minimum contiguous storage block and of reproducing files in real time according to the real time recording/reproduction information.

It is still another object of the present invention to provide a method of copying files in consideration of real time recording/reproduction information, adding the real time recording/reproduction information of original files to copied files, and reproducing the copied files in real time using real time recording/reproduction information.

It is yet another object of the present invention to provide an apparatus for recording a recording/reproduction bit rate as real time recording/reproduction information, for recording a plurality of recording/reproduction bit rates as real time recording/reproduction information when the recording/reproduction bit rate varies for different data sections, and for reproducing files in real time according to the real time recording/reproduction information.

It is still yet another object of the present invention to provide a file operating method of generating a file in which real time recording/reproduction information has been set, expanding data regions, recording and reproducing the file, and performing other file operations.

Additional objects and advantages of the invention will be set forth in part in the description which follows and, in part, will be obvious from the description, or may be learned by practice of the invention.

Accordingly, to achieve the above and other objects of the present invention, there is provided a recording medium in which real time files requiring real time recording/reproduction are recorded, wherein real time recording/reproduction information for ensuring real time recording/reproduction of the real time files is stored in a file control information area.

To further achieve the above and other objects of the present invention, there is provided a recording and reproducing method comprising the steps of: (a) arranging and recording real time files requiring real time recording/reproduction on the basis of real time recording/reproduction information for ensuring real time reproduction, and recording the real time recording/reproduction information; and (b) reading and reproducing the real time file data using the real time recording/reproduction information.

To still further achieve the above and other objects of the present invention, there is provided a recording and reproducing apparatus for recording and/or reproducing real time files on a disc using real time recording/reproduction information for ensuring real time recording/reproduction, the apparatus comprising: a codec for compressing and encoding an input bitstream according to a predetermined compression scheme and providing compressed data upon recording, and decoding the compressed and encoded data upon reproduction; a buffer for temporarily storing the compressed data at a recording bit rate using bit rate information included in the real time recording/reproduction information, and transmitting data written on the disc to the codec at a reproduction bit rate; a signal processor for converting the data stored in the buffer into a signal suitable for recording and transmitting the converted signal together with real time recording/reproduction information onto the disc upon recording, and reproducing data read from the disc according to the real time recording/reproduction information recorded on a predetermined area of the disc; and a controller for controlling the driving of a servo mechanism including a spindle motor according to bit rate information of the real time recording/reproduction information.

To still yet further achieve the above and other objects of the present invention, there is provided a method of operating a file for a system capable of writing and rewriting real time files to which real time recording/reproduction attribute information is assigned, wherein the real time files are operated in correspondence with any one process among a real time file creation process, area allocation process, a recording process, a reproduction process, a deletion process, and a closing process using the real time recording/reproduction attribute information.

BRIEF DESCRIPTION OF THE DRAWINGS

The above and other objects and advantages of the present invention will become more apparent by describing in detail preferred embodiments thereof with reference to the attached drawings, in which:

FIG. 7 is a flowchart illustrating a reproducing method using real time recording/reproduction information according to an embodiment of the present invention;

DESCRIPTION OF THE PREFERRED EMBODIMENTS

Preferred embodiments of a recording medium for storing real time recording/reproduction information, a real time recording and reproducing method and apparatus, and a file operating method using the real time recording/reproduction information will now be described referring to the attached drawings.

Figure 1:
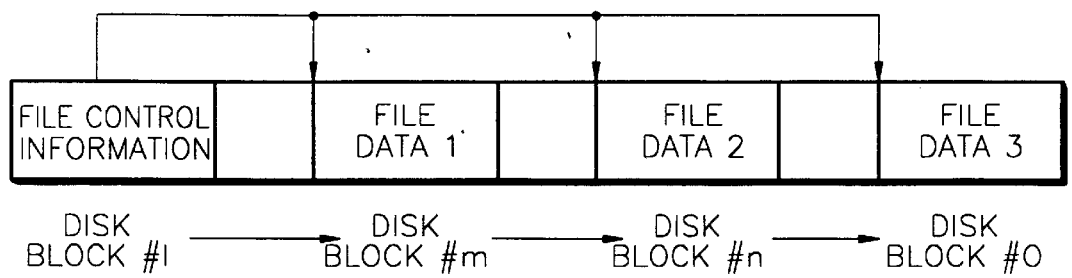
FIG. 1 is a view illustrating a one-dimensional structure of a recording medium, the structure showing the relationship between file control information and file data.
Figure 2:
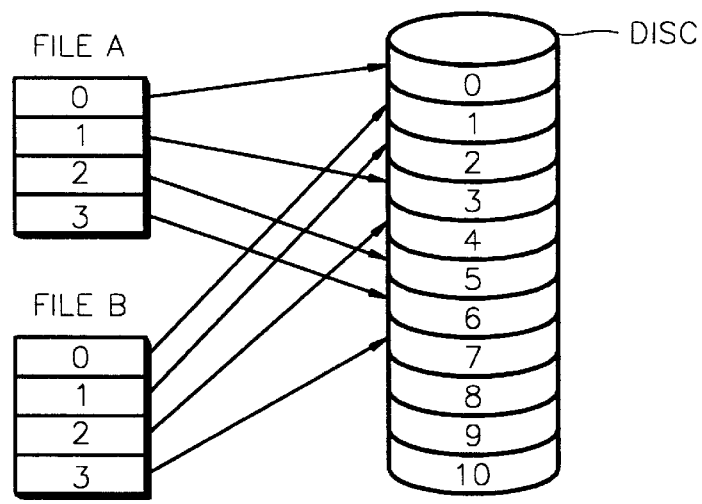
FIG. 2 is a view illustrating an example in which two conventional files occupy blocks on a disc.
Figures 3A, 3B, 3C, 3D:
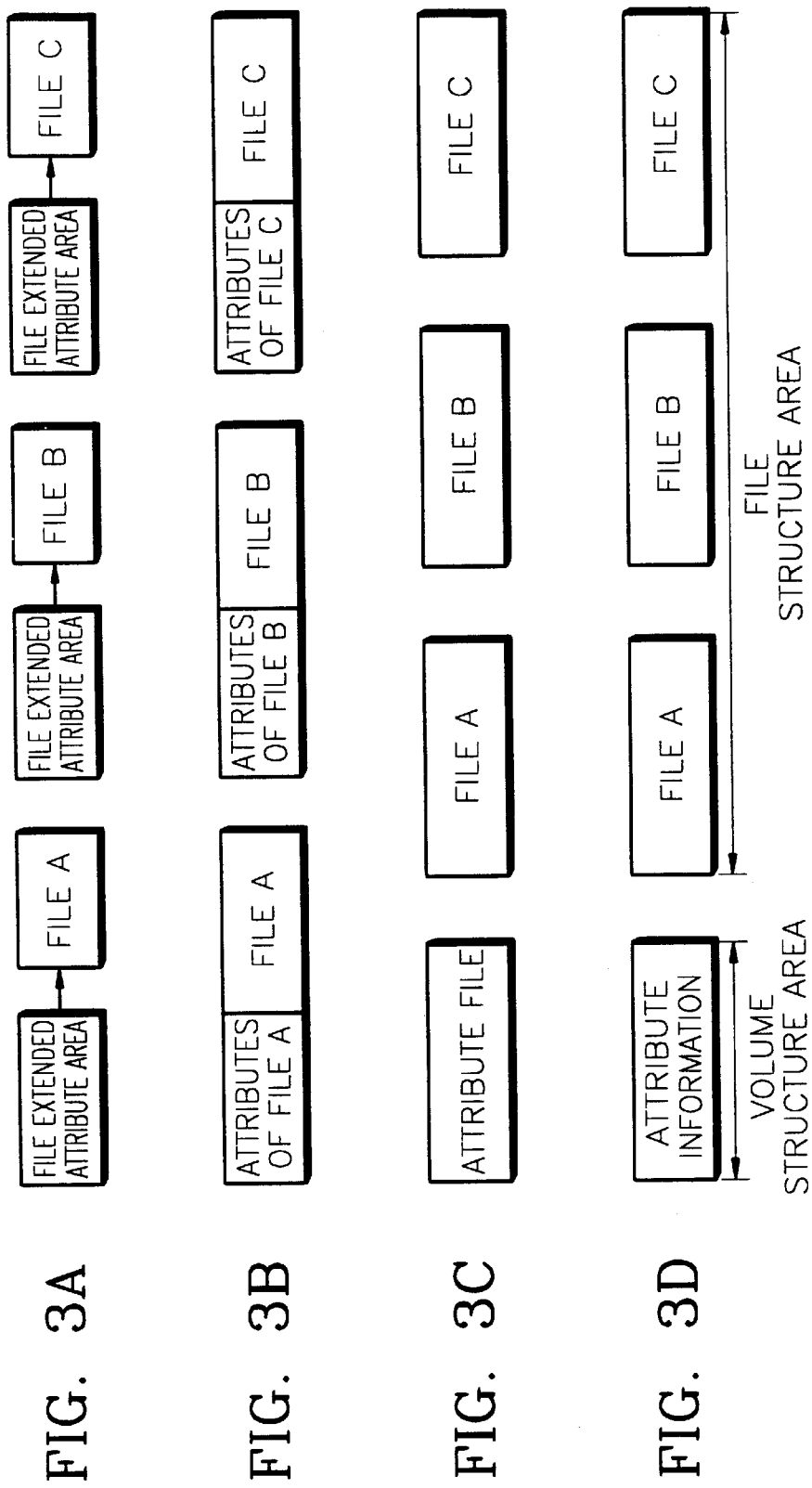
FIGS. 3A through 3D show examples of storage of real time recording/reproduction attribute information according to the present invention.

FIGS. 3A through 3D show examples of storing real time recording/reproduction information (this can be called real time recording/reproduction attribute information) according to the present invention. As shown in FIG. 3A, the real time recording/reproduction information can be provided as an attribute to each real time file. As an example, the real time recording/reproduction attribute information can be stored in an extended attribute field in a file entry or a stream directory ICB (information control block) field when a file system is a universal disk format (UDF) system.

Alternatively, the real time recording/reproduction attribute information can be stored in a file identifier descriptor field, a file type field, or a flag field among an ICB TAG field in a file entry. The file entry can be called a file control information area or a file structure area.

As shown in FIG. 3B, real time recording/reproduction attribute information for each file can be stored in a predetermined area (information area) in each file. For example, in the case of a real time rewritable (RTRW) format, real time recording/reproduction attribute information can be stored in a data file named RTRW_TS.VOB.

As shown in FIG. 3C, real time recording/reproducing attribute information for each file can be stored in a separate file. As an example, real time recording/reproduction attribute information can be stored in an information file having an RTRW format named RTRW_TS.IFO. As another example, when the file system is the UDF system, the real time recording/reproduction attribute information can be stored in a volume structure area separate from a file structure area, as shown in FIG. 3D.

Therefore, when real time recording/reproduction attribute information is stored in the volume structure area or file structure area in the UDF system, the real time recording/reproduction attribute information is first interpreted upon mounting a volume or opening a file, and data is then recorded/reproduced in real time according to the interpreted information.

Real time recording/reproduction file indication information (e.g., identifier="AV file") representing that a file requires real time recording/reproduction is included in the real time recording/reproduction attribute information. Among information on the size of the minimum contiguous storage block satisfying the condition of expression 1, reproduction time information for ensuring minimum contiguous storage, recording/reproduction bit rate information, and information on the contiguous recording/reproduction type, at least one can be stored in the real time recording/ reproduction attribute information. Here, if there are three types of discs A, B and C, the contiguous recording/ reproduction type information can be predetermined as follows:

type A=10.08 Mbps, type B=1.4 Mbps, type C=8 Mbps.

An attribute representing whether files are currently arranged so as to be recorded/reproduced in real time, i.e., an attribute representing the current real time recordable/ reproducible state of files, is also included in the real time recording/reproduction attribute information.

Real time recording/reproduction bit rate information is stored in the real time recording/reproduction attribute information. When the recording/reproduction bit rate is changed in each section, information associated with a plurality of bit rate values and sections (e.g., position information) can be stored in the real time recording/reproduction attribute information. The maximum allowable value of the real time recording/reproduction bit rate can be further stored in the real time recording/reproduction attribute information. Here, the control information of a spindle motor can be obtained by using the recording/reproduction bit rate information.

In addition, file defect management information, file buffering information, file allocation information, etc., can be included in the real time recording/reproduction attribute information. That is, if file defect management information is stored in the real time recording/reproduction attribute information, replacement of a defective block with a spare area is not attempted when reading or writing fails, and further reading or writing of the defective block is not attempted.

For example, file allocation information such as non-allocation of a defective block replaced by a spare area as a data block can be stored in the real time recording/ reproduction attribute information. File buffering information associated with the amount of data to be initially read from a track buffer and the amount of data to be recorded in the track buffer at a time can also be stored as the real time recording/reproduction attribute information.

Instead of individually storing many real time recording/ reproduction attributes such as file defect management information, file allocation information, and file buffering information, the conditions for controlling real time files are classified into types, and the information of the classified types is recorded in a real time recording/reproduction file attribute information area. In this way, easy real time recording and reproduction can be achieved. For example, the following types of information can be provided:

type A: a data bit rate of 10 Mbps, impossibility of allocation of a data block to a defective block replaced by a spare area, and impossibility of reattempt of reading upon failure in reading; and type B: a data bit rate of 8 Mbps, possibility of allocating a data block to a defective block replaced by a spare area, and impossibility of reattempting reading upon failure in reading.

Figure 4:
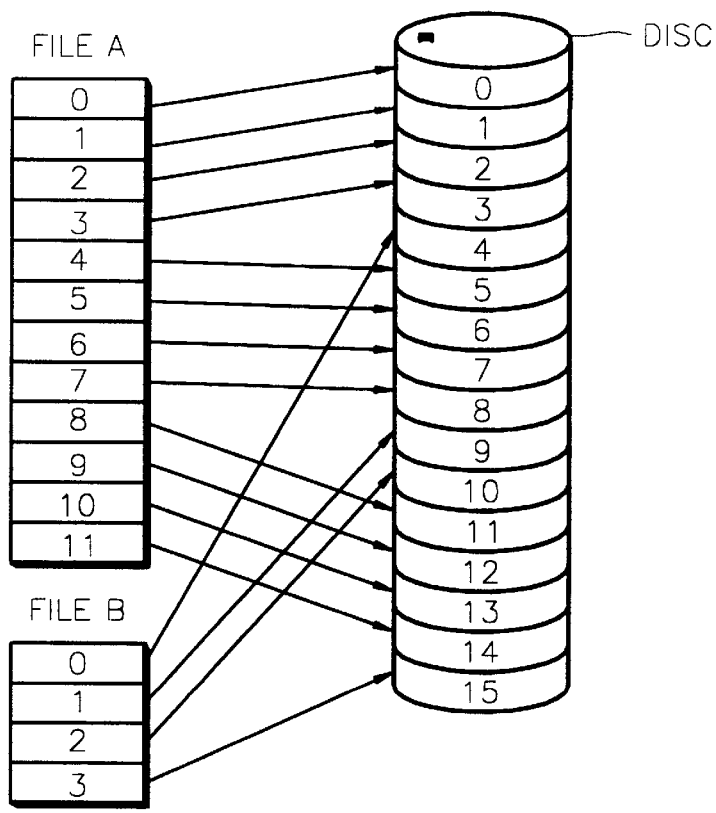
FIG. 4 is a view illustrating an example in which real time files according to the present invention, comprised of minimum contiguous storage blocks, occupy blocks on a disc.

Meanwhile, referring to FIG. 4 showing an example of real time files comprised of minimum contiguous storage blocks occupying blocks on a disc according to the present invention, a file A is a file requiring real time reproduction. If a minimum contiguous storage block satisfying the condition of expression 1 is comprised of four blocks, the file A is recorded in real time in units of four blocks. That is, the real time file A occupies blocks 0, 1, 2, 3, 5, 6, 7, 8, 11, 12, 13 and 14 on a disc. A general file B occupies blocks 4, 9, 10 and 15 on the disc. The general file B not requiring real time reproduction has a minimum contiguous storage block comprised of one block, and one or an arbitrary number of segments can be stored. This block generally corresponds to a sector of a disc.

The file A operates for real time reproduction, as follows.

In step 1, blocks 0, 1, 2 and 3 are read. In step 2, block 5 is searched for during playback of the blocks 0, 1, 2 and 3. In step 3, blocks 5, 6, 7 and 8 are read. In step 4, block 11 is searched for during playback of the blocks 5, 6, 7 and 8. In step 5, blocks 11, 12, 13 and 14 are read and played back.

If no areas for contiguous blocks capable of satisfying the minimum contiguous storage block exist on a disc upon storage of a file requiring real time reproduction, recording of the file is not possible. However, if a warning message like "Contiguous recording is not possible. Shall the minimum contiguous storage block be designated as one block and the file be stored in the designated block length ?" is sent to a user, and if the user requires storage, the file can be stored in the minimum contiguous storage blocks comprised of one block. In this case, the value of the initially-designated minimum contiguous storage block is stored in the information associated with the minimum contiguous storage block length included in the real time recording/ reproduction attributes, but information indicating that the arrangement of currently stored files makes real time recording/reproduction impossible is stored in a current real time recordable/reproducible state attribute. This is done so that a file to be copied can be contiguously treated as a real time recording/reproduction file when the file is copied on different discs or the same disc.

In the present invention, a driving apparatus, such as a CD drive and a DVD drive, having a seek time (e.g., 150 ms) significantly longer than a read time (e.g., 1.43 ms), which is expressed by seek time>>read time, can also realize real time reproduction if it satisfies the condition of expression 1: seek time+read time<playback time.

Meanwhile, the minimum contiguous storage block limits the allocation of a free block on a disc to satisfy a predetermined purpose. Here, the free block means a non-used area having no defective blocks or a rewritable area among user areas that can be used by a user.

If the minimum contiguous storage block is defined as 16 blocks arranged in an error correction code (ECC) block, the allocation of a data block is not possible for less than 16 contiguous free blocks. Also, the allocation of a data block is not possible for 16 contiguous free blocks ranging over two ECC blocks. Here, the minimum contiguous storage block has the purpose of recording and reproducing a DVD-RAM in an ECC unit.

When all real time data is stored on physically-contiguous blocks on a disc, no seeking occurs, and thus recording/ reproduction is prevented from being interrupted. However, since contiguous blocks do not infinitely exist, a minimum contiguous storage block is calculated and stored as real time recording/reproduction attributes of a file, and real time data is recorded in the minimum contiguous storage block. In this way, the interruption of a screen can be prevented.

If an MPEG playback bit rate (=$V_b$) of 8 Mbps, a seek time of 150 ms, a read bit rate (=$V_a$) of 11 Mbps, a block of 2048 bytes, and data having ECC blocks each comprised of 16 blocks is recorded in a recording medium such as a disc, the minimum contiguous storage block S can be obtained according to the condition of expression 1 as shown in the following expression 2:

$$(1-V_b/V_a) \times (2048 \times 8) \times S > V_b \times \text{seek time}/1000 \qquad (2)$$

From this expression, the minimum contiguous storage block S is 261 blocks. When data is recorded in units of at least 261 blocks designated as the minimum contiguous storage block, real time reproduction is possible. However, 272 blocks corresponding to 17 contiguous ECC blocks can be designated as the minimum contiguous storage block. Here, the predetermined purpose is to ensure recording/reproduction when the maximum seek time is 150 ms.

With one ECC block comprised of 16 blocks designated as the minimum contiguous storage block, and a limitation such as the seek time added as shown in expression 2, a free block allocation method for real time recording and reproduction is classified into steps, and the steps can be arranged as shown in Table 1:

TABLE 1

| | number of contiguous blocks | purposes |
|---|---|---|
| third step | 1088 blocks (ECC arrangement) | ensuring real time recording/reproduction between blocks requiring a seek time of 600 ms |
| second step | 272 blocks (ECC arrangement) | ensuring real time recording/reproduction between blocks requiring a seek time of 150 ms |
| first step | 16 blocks (ECC arrangement) | ensuring recording and reproduction in an ECC unit (all allocated blocks must satisfy the first step) |

A/V data is recorded and reproduced by arranging blocks satisfying a limitation on the minimum contiguous storage block whose number of blocks depends on each step, so that the blocks can be physically connected to each other, whereby real time recording and reproduction can be ensured. For example, when there are three groups of blocks of the minimum contiguous storage block: 16 blocks, 272 blocks and 1088 blocks, and the seek time is 150 ms, the possibility of real time recording/reproduction depends on the method of connecting the blocks.

That is, when 272 blocks, 1088 blocks, and 16 blocks are sequentially arranged, real time recording and reproduction is possible, and when 16 blocks, 272 blocks and 1088 blocks are sequentially arranged, real time recording and reproduction is not possible.

Accordingly, the minimum contiguous storage block can be effectively recorded and reproduced in real time using the allocation of blocks by steps and the block connecting method.

Figure 5:
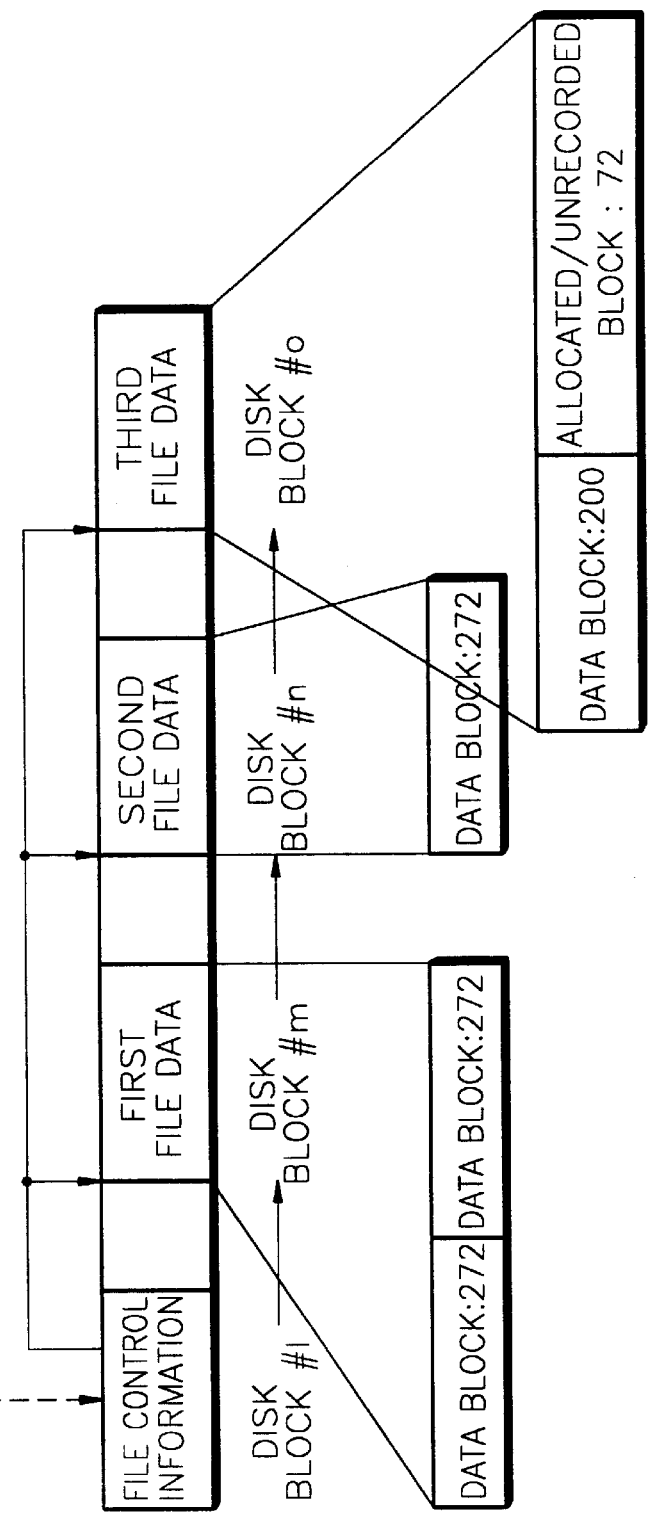
FIG. 5 is a view illustrating a one-dimensional structure of a recording medium for recording real time AV data allocated into minimum contiguous storage blocks according to the present invention.

Meanwhile, if the end portion of a file is not filled with as much data as in a minimum contiguous storage block as shown in FIG. 5, even when the file is recorded according to the condition of the minimum contiguous storage block, an attribute representing that data blocks for the unfilled area are allocated but not recorded is stored as real time recording/reproduction information, thus allowing real time playback upon additional recording.

That is, referring to FIG. 5 showing the one-dimensional structure of a recording medium in which real time AV data stored in the minimum contiguous storage block is placed, real time recording/reproduction attribute information in addition to the length of a file, information on the position of file data, information on the possibility or impossibility of reading/writing a file, etc., is further stored in file control information positioned at a disk block #1. Two minimum contiguous storage blocks each comprised of 272 data blocks are allocated to first file data placed at a disk block #m, 272 data blocks for the minimum contiguous storage block are allocated to second file data positioned at a disk block #n, and 200 data blocks and 72 allocated/unrecorded blocks are allocated to third file data positioned at a disk block #o.

When a file for real time recording/reproduction is copied on the same disc or different discs, the data blocks of the file must be arranged on the disc using real time recording/reproduction attribute information so that the file can be played back in real time. If the arrangement of the data blocks is not possible, the data blocks are arranged on the same basis as the arrangement basis of general file blocks. Here, the real time recording/reproduction attribute information maintains the original attribute information, but the impossibility of real time recording/reproduction is set as a current real time recordable/reproducible state attribute.

Figure 6A:
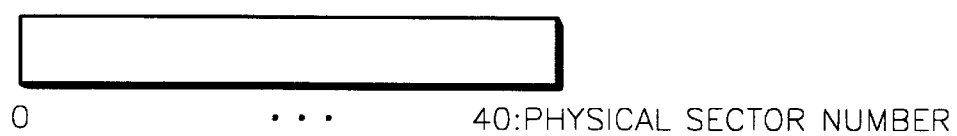
FIGS. 6A and 6B are views illustrating examples of copying a file comprised of minimum contiguous storage blocks according to the present invention.
Figure 6B:
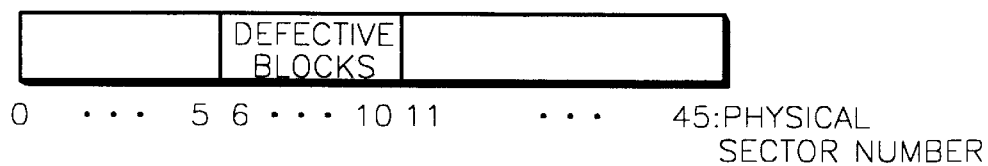

Also, when an operating system (OS) detects defective blocks on a disc upon copying of a file, data blocks to be copied must be arranged in consideration of the original real time recording/reproduction attribute information and medium defect management information recorded in a secondary defect list (SDL). For example, when the minimum contiguous storage block is 40 blocks as shown in FIG. 6A, data blocks are arranged in consideration of a defective area of a disc to copy a file on, as shown in FIG. 6B. On the other hand, when the OS does not detect defects recorded in the SDL, data is allocated to blocks other than the defective block area in an application program for copying and in consideration of real time recording/reproduction attribute information as shown in FIG. 6B.

FIG. 7 is a flowchart illustrating a reproducing method using real time recording/reproduction information, according to an embodiment of the present invention. A disc is loaded on a player in step S101, and the player reads a volume area from the disc in step S102. A determination of whether real time recording/reproduction information exists in the volume area is made in step S103. If real time recording/reproduction information exists in the volume area, playback of files is set in consideration of the real time recording/reproduction information, in step S104. If it is determined in step S103 or after step S104 that no real time recording/reproduction information exists on the volume area, reading of the volume area is completed in step S105.

Thereafter, a file is read in step S106. It is determined whether real time recording/reproduction information exists in the read file, in step S107. If the real time recording/reproduction information exists in the read file, playback of the file is set in consideration of the real time recording/reproduction information, in step S108. If it is determined in step S107 or after step S108 that no real time recording/reproduction information exists in the read file, the read file is played back in consideration of whether the real time recording/reproduction information has been set, in step S109.

Here, when real time recording/reproduction information exists in the volume structure area, steps S107 and S108 may not be performed. Also, when real time recording/reproduction information exists in a file control information area, steps S103, S104 and S105 may not be performed.

Figure 8:
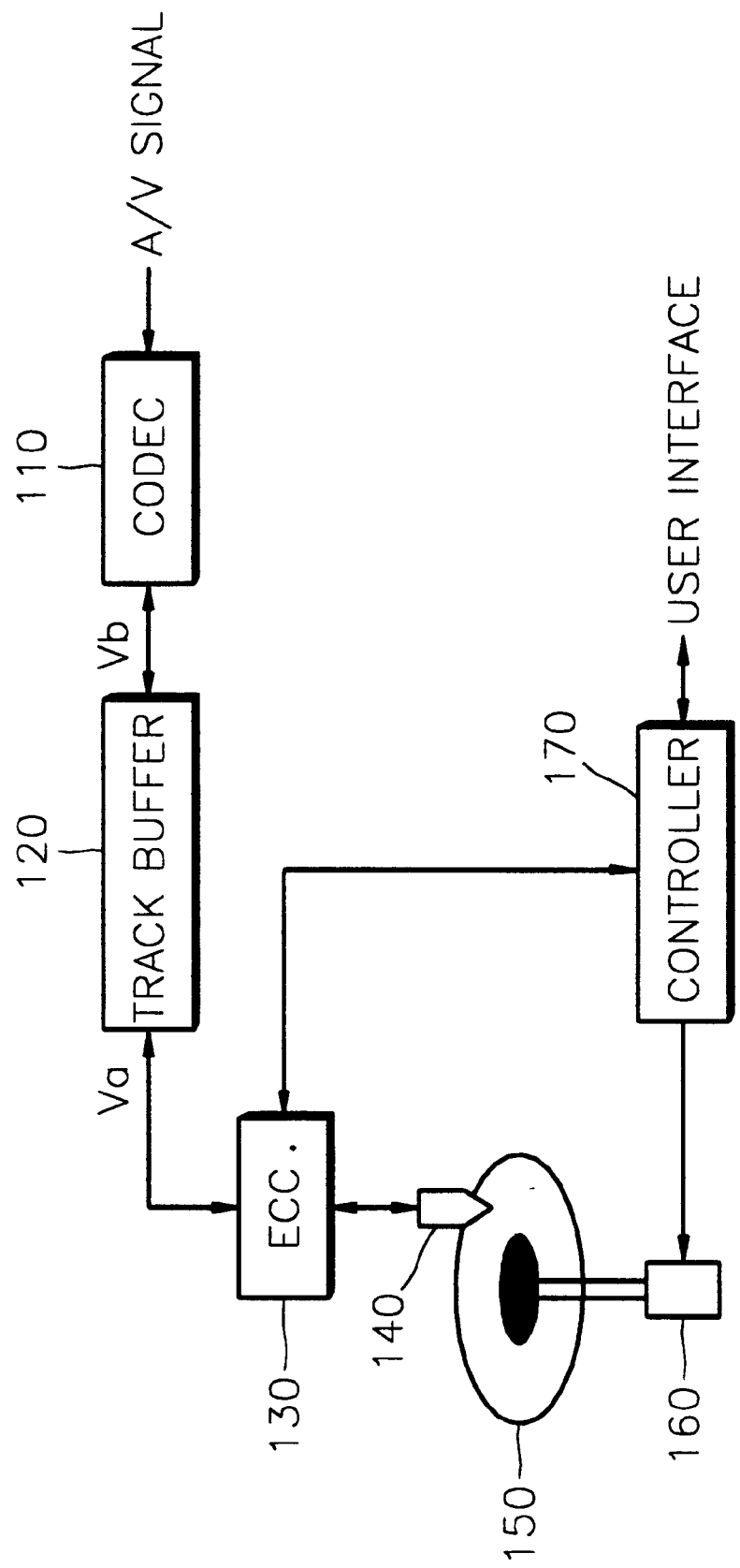
FIG. 8 is a schematic block diagram of a disc recording and reproducing apparatus applied to the present invention.

FIG. 8 is a schematic block diagram of a disc recording and reproducing apparatus to be applied to the present invention. The function of the apparatus for recording and reproducing A/V data using a recordable and rewritable disc is divided into recording and reproduction.

Upon recording, a codec 110 compresses and encodes an audio/video (A/V) signal from an external bitstream using a predetermined compression scheme, and writes data compressed according to a recording/reproduction bit rate (Vb) to a track buffer 120. An error correction encoder and decoder (ECC) 130 error-correct encodes the data written to the track buffer 120, reads the error-correction encoded data at a write/read bit rate Va, and applies the result to a pickup unit 140. Also, the ECC 130 applies real time recording/reproduction information generated under the control of a controller 170 to the pickup unit 140 so that the information can be recorded on a volume structure area or a file control information area. The pickup unit 140 converts the error-correction encoded data into a radio frequency (RF) signal and records the RF signal on a disc 150. Here, the recording rotating speed of a spindle motor 160 for driving the disc 150 is controlled according to a servo control signal from the controller 170.

Upon reproduction, when real time recording/reproduction information is stored in the file control information area or the volume structure area, buffering information associated with the amount of data to be initially read from the track buffer, file allocation information, defect management information, recording/reproduction bit rate information, etc., are read in advance, and reading of file data is controlled on the basis of the read information. File data to be satisfied by the condition of the minimum contiguous storage block is read from the disc 150 at a write/read bit rate Va. The read file data is error-correction decoded by the ECC 130 via the pickup unit 140, and written to the track buffer 120. The codec 110 reads data written to the track buffer 120 at the recording/reproduction bit rate Vb, decodes the read data, and reproduces A/V data.

When recording/reproducing bit rate information exists in the real time recording/reproduction information, the controller 170 obtains the control information of the spindle motor 160 from the recording/reproducing bit rate information provided from the pickup unit 140 and the ECC 130, and can drive not only the spindle motor but also a servo mechanism.

Figure 9:
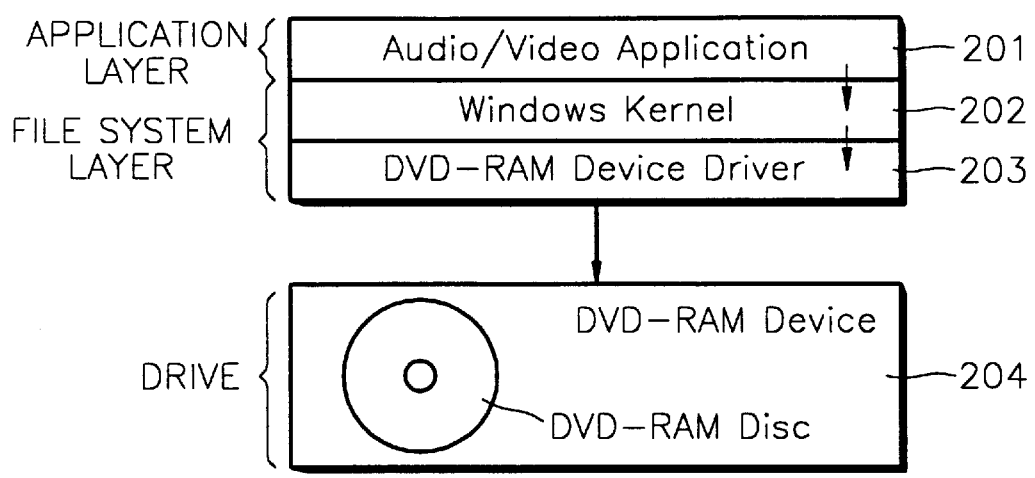
FIG. 9 is a view showing a flow of control for real time recording/reproduction for a real time rewritable system.

FIG. 9 is a view showing the flow of control for recording/reproducing data on a disc to which real time real time recording/reproduction attributes are provided, in a real time rewritable (RTRW) system.

The RTRW system is comprised of an application layer 201 for producing a command associated with A/V data recording/reproduction, a Windows kernel 202 for interpreting the produced command, and a device driver 203 having a file system the same as the file system of a DVD-RAM device driver for requesting a corresponding function according to the command interpreted by the Windows kernel 202 by transmitting a driver command to a drive 204. Here, the Windows kernel 202 and the device driver 203 correspond to a file system layer, and the Windows kernel 202 can be called a kernel layer.

Figure 10:
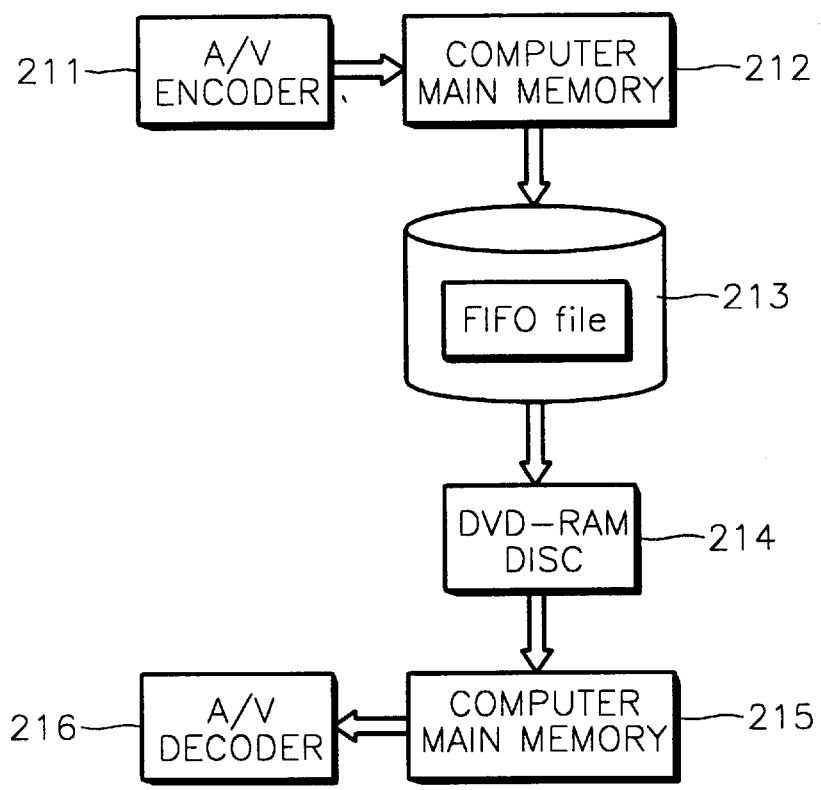
FIG. 10 is a block diagram showing a flow of data for real time recording/reproduction for a real time rewritable system.

FIG. 10 is a block diagram showing the flow of real time recording/reproduction data for a computer system among RTRW systems ms. Upon recording, the following processes are performed in a multitasking manner: storing A/V data input to an A/V encoder 211 in a computer main memory 212 in real time; storing A/V data stored in the computer main memory 212 in a first-in first-out (FIFO) file of a hard disk drive (HDD) 213; and storing the A/V data from the FIFO file of the HDD 213 in a DVD-RAM disk 214. Here, when a sufficient main memory exists on a computer, the FIFO file may not exist in the HDD.

Upon reproduction, a process for storing A/V data from the DVD-RAM disk 214 in a computer main memory 215 in real time and a process for reading the A/V data stored in the main memory 215 through an A/V decoder 216 are performed in a multitasking way.

For example, the function of an RTRW system using a Windows kernel is divided into creation of a file to which real time recording/reproduction attributes are provided, allocation of a data area, data recording, data reproduction, data deletion, and file closing, and these divided functions will now be described referring to FIG. 9.

Method of creating a real time recording/reproduction file.

In the first step, a Windows kernel API (application programming interface) called to create a real time recording/reproduction file is a create file. The application layer 201 assigns a file attribute as FILE_ATTRIBUTE_RTRW to the create file to create the real time recording/reproduction file, and calls the Windows kernel 202 as in the following example:

example: FileHandle=CreateFile ("AVFILE.MPG", FILE_ATRIBUTE_RTRW, ... )

In the second step, the Windows kernel 202 orders the DVD-RAM device driver 203 to create a file.

In the third step, the DVD-RAM device driver 203 designates a FILE ATTRIBUTE_RTRW attribute when the file generation function is ordered. When the FILE-ATTRIBUTE_RTRW attribute is designated, file control information is stored in an extended attribute area of a file entry, a stream directory ICB (information control block) area, a file identifier descriptor area, or a file type area or flag area of an ICB TAG field in a file entry. Here, bit rate information can also be set when an A/V file is created.

A method of allocating an allocated/unrecorded area of a real time recording/reproduction file is performed as follows.

In the first step, a Windows kernel API called to allocate an allocated/unrecorded area of a real time recording/reproduction file is a set file pointer having a seek function. In order for the application layer 201 to pre-allocate a data area of a real time recording/reproduction file in advance as an allocated/unrecorded area as large as a minimum contiguous storage block, the set file pointer calls the Windows kernel 202 as in the following example:

example: SetFilePointer (FileHandle,8×1024×1024, NULL,FILE_END)
    SetFileBitrate (FileHandle,bitrate)

Alternatively, a data area necessary for real time recording/reproduction can be pre-allocated in advance as an allocated/unrecorded state using the SetFileBitrate (FileHandle,bitrate). Here, when the application layer knows a bit rate, and an API for converting the bit rate into the number of blocks exists in the file system layer, the number of blocks obtained by the API can be secured as the data area necessary for real time recording/reproduction in an allocated/unrecorded state using the SetFilePointer.

In the second step, the Windows kernel 202 orders the DVD-RAM device driver 203 to seek a file.

Figure 11:
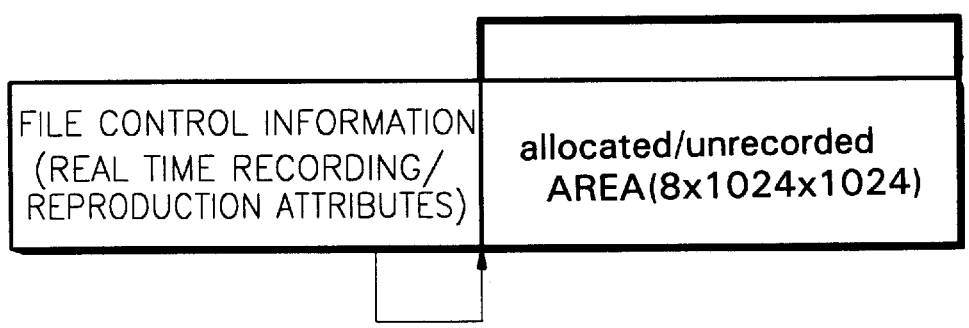
FIG. 11 is a view illustrating an example of allocating an unrecorded/unallocated area in a real time recorded/reproduced file.

In the third step, the DVD-RAM device driver 203 checks if real time recording/reproduction attributes are assigned to a file, upon ordering of the file seeking function, and secures an allocated/unrecorded data area as large as the length for seeking according to minimum contiguous storage conditions (for example, file defect management, file allocation, file buffering, the magnitude of a minimum contiguous storage block, and bit rate information) specified in the assigned real time recording/reproduction attributes, as shown in FIG. 11. One pre-allocated area or a plurality of areas are arranged in an ECC unit and can be allocated.

A method of recording data of a real time recording/reproduction file is as follows.

In the first step, a Windows kernel API 202 called to record the data of the real time recording/reproduction file is a write file. The application layer 201 calls a Windows kernel using a write file as in the following example, to store real time data:

example: WriteFile (FileHandle,AV_Buffer,32×1024, NULL,NULL)

In the second step, the Windows kernel 202 calls the file recording function of the DVD-RAM device driver 203.

In the third step, the DVD-RAM device driver 203 checks if real time recording/reproduction attributes are assigned to a file, upon calling the file recording function. If the real time recording/reproduction attributes are assigned, A/V data to be recorded is recorded in an allocated/unrecorded area according to real time recording conditions. Upon recording, when no allocated/unrecorded area exists, the magnitude of recorded data is reported to the application layer 201. The application layer 201 pre-allocates an allocated/unrecorded area designated as the real time recording/reproduction attributes to record the left-over unrecorded data using a seek command SetFilePointer with reference to the amount of recorded data, and again records the left-over data.

Figure 12A:
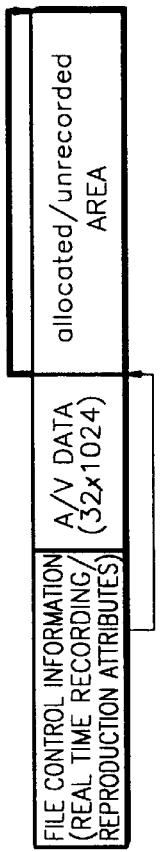
FIGS. 12A through 12D are views illustrating examples of recording data of a real time recorded/reproduced file.

That is, as shown in FIG. 12A, A/V data of 32×1024 bytes is recorded in an allocated/unrecorded area of 8×1024×1024 bytes shown in FIG. 11, and the residual area is still allocated as the allocated/unrecorded area.

Figure 12B:
Figure 12C:
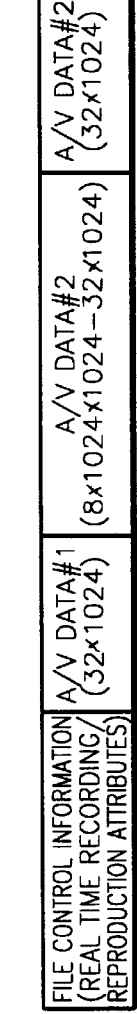
Figure 12D:
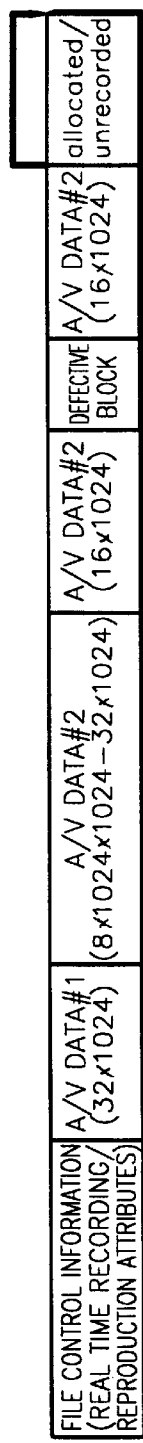

As shown in FIG. 12B, when the amount of data recorded in a variable written in the application layer 201 is reported since the allocated/unrecorded area is 32×1024 bytes short, the file system layer automatically pre-allocates an unallocated area using bit rate information designated through the SetFileBitrate. As shown in FIG. 12C, the residual data is recorded in the ECC block unit. When a defective block is generated during recording and an error is thus generated, a block corresponding to the defective block is excluded from the allocated/unrecorded area as shown in FIG. 12D.

Figure 13A:
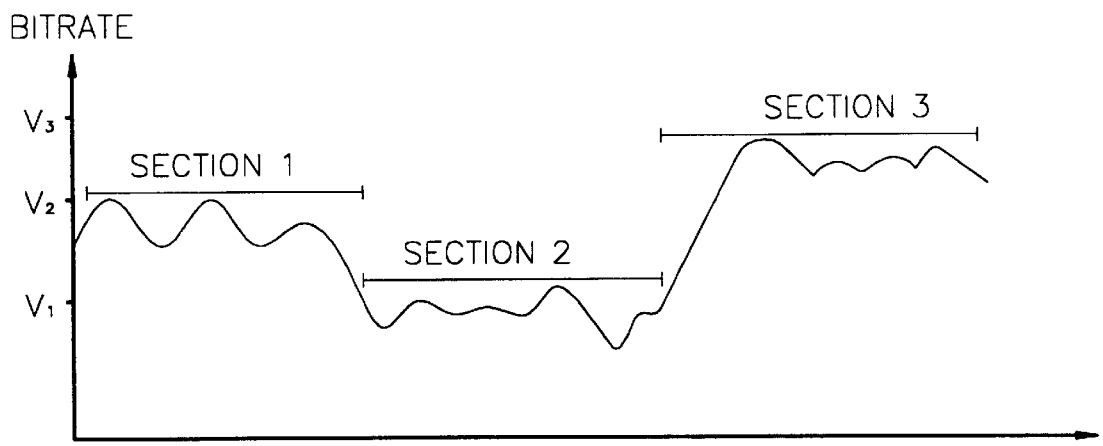
FIGS. 13A through 13D are views illustrating file control information corresponding to when different bit rates are provided in different sections and when an identical bit rate is provided in the entire file data section.
Figure 13B:
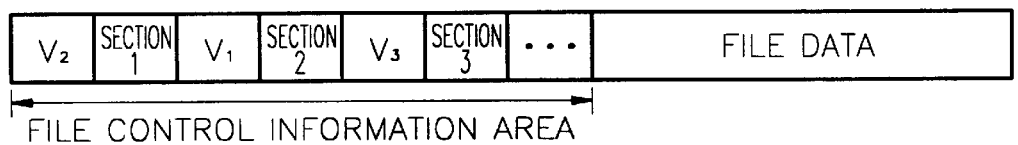
Figure 13C:
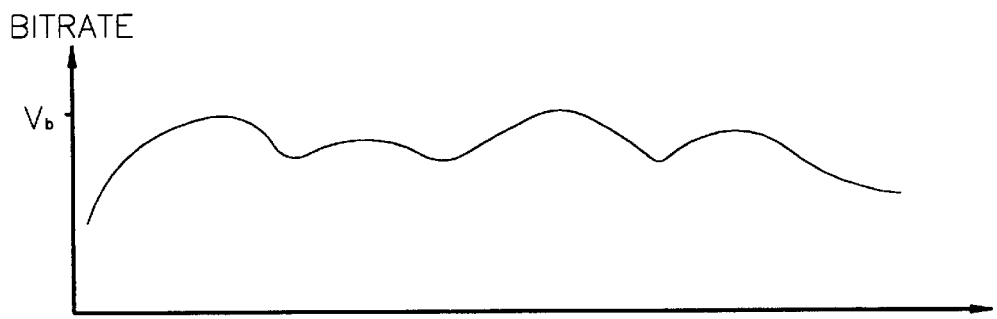
Figure 13D:
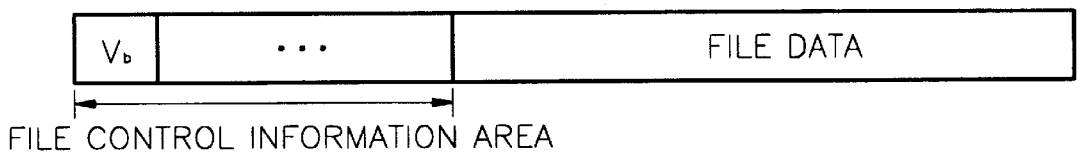

Here, when the bit rates for sections can be distinguished from each other, information associated with the bit rate for each section can be recorded in a file control information area. That is, FIGS. 13A and 13B show an example of a plurality of bit rate values (here, $V_1$, $V_2$ and $V_3$) and information associated with sections stored as real time recording/reproduction information in a file control information area when different bit rates are provided in different sections. FIGS. 13C and 13D show an example of one bit rate value (here, $V_b$) stored as real time recording/reproduction information in a file control information. area when an identical bit rate is provided in the entire file data section.

A method of reproducing real time recording/reproduction file data is performed as follows.

In the first step, a Windows kernel 202 called to reproduce the data of a real time recording/reproduction file is a read file. The application layer 201 calls a Windows kernel using the read file as in the following example, to reproduce real time data:

example: ReadFile (FileHandle,AV_Buffer,32×1024, NULL,NULL)

In the second step, the Windows kernel 202 orders the DVD-RAM device driver 203 to read a file.

In the third step, the DVD-RAM device driver 203 checks if real time recording/reproduction attributes are assigned to the file, when the file reading function is ordered. If the real time recording/reproduction attributes are assigned, A/V data as long as the length for reproduction is reproduced from an A/V data area according to real time reproduction conditions.

Here, when a defect is generated in a block to be reproduced, a read command indicating that allocated/unrecorded file attributes are assigned but not read is transmitted from the DVD-RAM device driver 203 to the drive 204.

A real time recording command and a reproducing command provided by a command interface of the DVD-RAM device driver 203 must be used upon real time recording/reproduction.

A method of deleting part of real time recording/reproduction file data is performed as follows.

In the first step, a "DeletePartOfFile" is called as the Windows kernel 202 to delete part of the data of a real time recording/reproduction file. In order to delete part of real time data, the application layer 201 calls the Windows kernel 202 using the "DeletePartOfFile" as in the following example:

example: DeletePartOfFile (FileHandle,Offset,Size)

In the second step, the Windows kernel 202 orders the DVD-RAM device driver 203 to delete part of the file.

In the third step, when partial deletion of the file is ordered, the DVD-RAM device driver 203 checks if real time recording/reproduction attributes are assigned to the file, and deletes data from an A/V data area according to real time conditions if the real time recording/reproduction attributes have been assigned. Upon partial deletion of a file, a file for managing a dummy file or an ECC padding space list is created under a root directory on a system file.

Figures 14A, 14B, 14C:
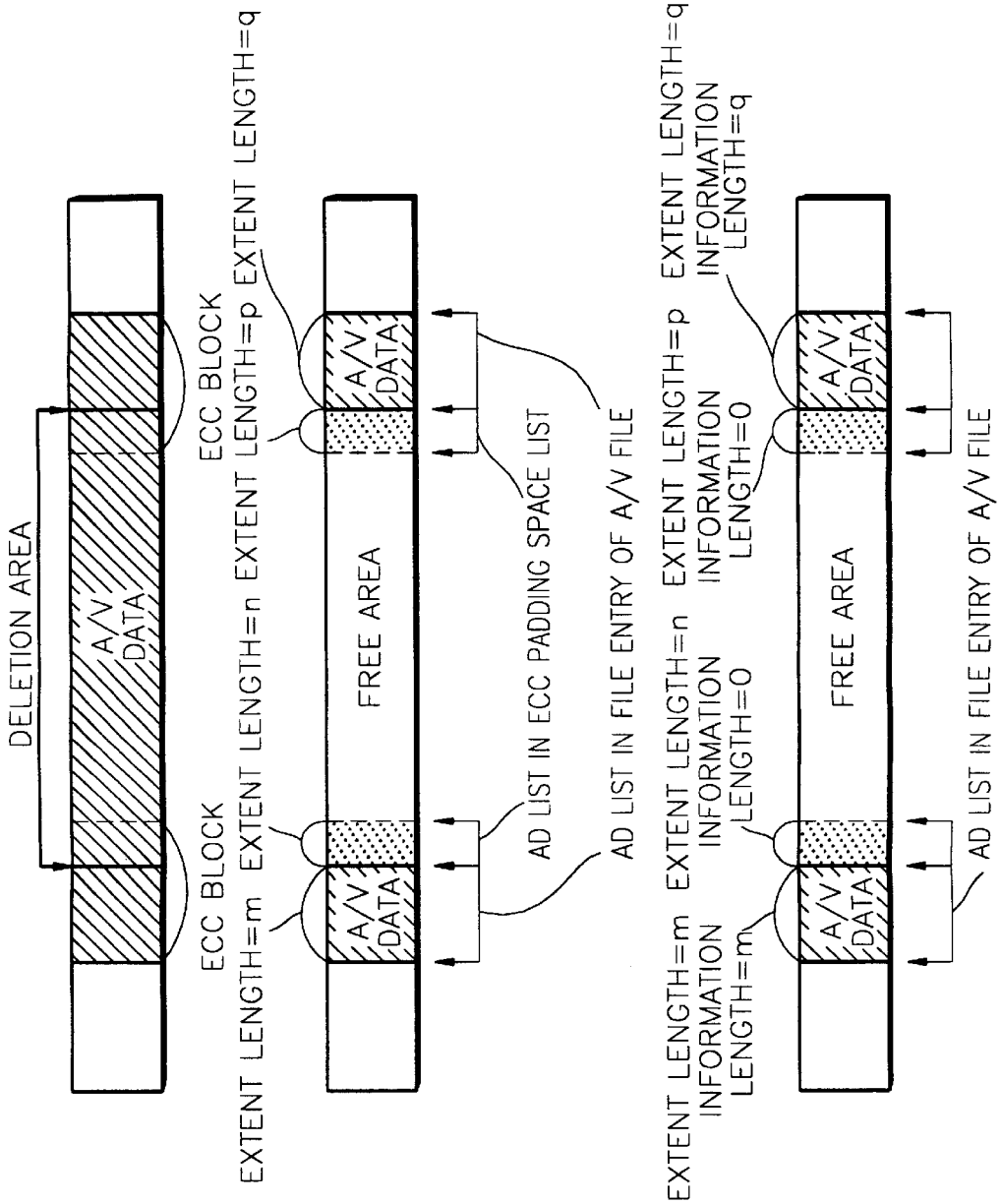
FIGS. 14A through 14C are views illustrating partial deletion of real time recorded/reproduced file data.

FIG. 14A shows an area to be deleted from a real time file in which A/V data is arranged in ECC units. The deletion area is allocated to a free area as shown in FIG. 14B, and an A/V data section pertaining to the deletion area, among an ECC block ranging over the boundary of the deletion area, is called a padding space. A/V data in this padding space is managed as a separate file on the system file and stored in an allocation descriptor (AD) list in an ECC padding space list. A/V data not pertaining to the deletion area, in the ECC block, is stored in the AD list of a file entry. The ECC padding space list is again updated according to a function such as deletion or writing. When an application of the method according to the present invention is a UDF system, the ECC padding space list can be described by a short allocation descriptor.

In FIG. 14B, the A/V file space and the padding space of the ECC block ranging over the boundary of the deletion area have extent lengths. As shown in FIG. 14C, the A/V file space of the ECC block ranging over the boundary of the deletion area has both an extent length and an information length, but the padding space is managed as an allocation descriptor having an extent length and an information length of "0" in the AD list in an A/V file entry. The A/V file space not pertaining to the deletion area, in the ECC block, is also managed in the AD list in the AV file entry. In this case, the padding space can be defined as an extended allocation descriptor of UDF.

A method of closing a real time recording/reproduction file is performed as follows.

In the first step, a CloseHandle function is called as a Windows kernel 202 to close a real time file. In order to close a real time recording/reproduction file, the application layer 201 calls the window kernel 202 using the Close-Handles function as in the following example:

example: CloseHandle (FileHandle)

In the second step, the window kernel 202 orders the DVD-RAM device driver 203 to seek a file.

In the third step, when the file closing function is ordered, the DVD-RAM device driver 203 updates file control information (file entry, etc.) and disk information (e.g., free area information, etc.).

According to the present invention as described above, real time recording/reproduction attributes are assigned to a file, and the file is recorded/reproduced in a different way from a general file. In this way, a real time recording/reproduction file can be recorded/reproduced in real time.

Also, in the present invention, files are divided into real time files and general files, and defect management information, file allocation information, buffering information, and the magnitude information of a minimum contiguous storage block provided in each step are assigned as real time recording/reproduction information to the real time file upon recording/reproduction. Thus, real time recording/reproduction can be effectively performed.

Furthermore, in the present invention, the control information of a spindle motor is obtained from real time recording/reproduction information associated with a recording/reproduction bit rate, thus controlling the spindle motor.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A recording medium, comprising:
    real time files requiring real time recording/reproduction; and
    a file control information area comprising real time recording/reproduction information indicating whether real time recording/reproduction of the real time files is ensured.

2. A recording medium, comprising:
    real time files requiring real time recording/reproduction; and
    a file control information area in which real time recording/reproduction information for ensuring real time recording/reproduction of the real time files is stored,
        wherein the real time recording/reproduction information includes file indication information indicating that the real time files require real time recording/reproduction.

3. A recording medium, comprising:
    real time files requiring real time recording/reproduction; and
    a file control information area in which real time recording/reproduction information for ensuring real time recording/reproduction of the real time files is stored,
        wherein the real time recording/reproduction information includes at least one of recording/reproduction bit rate information, information on minimum contiguous storage blocks satisfying a condition in which a playback time of a current data block is greater than a sum of a seek time and a read time of a data block to be played back next, and information on a playback time for ensuring minimum contiguous storage.

4. The recording medium as claimed in claim 3, wherein the recording/reproduction bit rate information includes control information of a spindle motor.

5. The recording medium as claimed in claim 3, wherein the real time files have sections with different bit rates, and the recording/reproduction bit rate information includes a plurality of bit rate values corresponding to the different bit rates of the sections, and information associated with the sections.

6. The recording medium as claimed in claim 5, wherein the real time recording/reproduction information further includes a maximum allowable value information of a real time recording/reproduction bit rate of the real time files.

7. The recording medium as claimed in claim 3, wherein the information on the minimum contiguous storage blocks is determined depending on a maximum seek time of the current data block.

8. The recording medium as claimed in claim 3, wherein the minimum contiguous storage blocks are determined in accordance with a size of an error correction code block unit and a maximum seek time of the current data block.

9. The recording medium as claimed in claim 8, wherein the real time recording/reproduction information further includes block connecting information for connecting blocks for the minimum contiguous storage blocks, to accomplish the real time reproduction.

10. The recording medium as claimed in claim 3, wherein the real time recording/reproduction information further includes attribute information indicating that if an end portion of a file is not filled with data by the minimum contiguous storage blocks, data blocks for the unfilled portion are allocated in advance but unrecorded.

11. The recording medium as claimed in claim 3, wherein the real time recording/reproduction information further includes current real time recordable/reproducible state information indicating whether a current file is arranged so as to be recorded/reproduced in real time.

12. The recording medium as claimed in claim 3, further comprising a spare area, wherein the real time recording/reproduction information further includes file defect management information indicating that replacement of a defective block with a block in the spare area and rereading or rewriting of the defective block are not attempted when reading or writing of one of the real time files fails.

13. The recording medium as claimed in claim 12, wherein the real time recording/reproduction information further includes file allocation information indicating that a data block is not allocated to the defective block replaced by the spare area.

14. The recording medium as claimed in claim 3, wherein the real time recording/reproduction information includes file buffering information associated with an amount of data to be initially read from a buffer and an amount of written data to a buffer at a time.

15. The recording medium as claimed in claim 3, wherein the real time recording/reproduction information further includes current real time recordable/reproducible state information indicating whether it is possible to record/reproduce a current file in real time.

16. A recording medium, comprising:
    real time files requiring real time recording/reproduction; and
    a file control information area in which real time recording/reproduction information for ensuring real time recording/reproduction of the real time files is stored,
        wherein the real time recording/reproduction information includes contiguous recording/reproduction type information classified by conditions for controlling the real time files, the conditions including file defect management information, file allocation information, file buffering information, and information of the minimum contiguous storage blocks of the real time files.

17. A recording medium, comprising:

real time files requiring real time recording/reproduction; and a file control information area of a universal disk format (UDF) system comprising real time recording/reproduction information indicating whether real time recording/reproduction of the real time files is ensured.

18. The recording medium as claimed in claim 17, the file control information area includes an extended attribute field of a file entry for the UDF system in which the real time recording/reproduction information is stored.

19. The recording medium as claimed in claim 17, wherein the file control information area includes a file identifier descriptor field of the UDF system in which the real time recording/reproduction information is stored.

20. The recording medium as claimed in claim 17, wherein the file control information area includes a stream directory ICB (information control block) field for the UDF system in which the real time recording/reproduction information is stored.

21. A recording medium, comprising:

real time files requiring real time recording/reproduction; and a file control information area of a universal disk format (UDF) system in which real time recording/reproduction information for ensuring real time recording/reproduction of the real time files is stored, wherein the file control information area includes an extended attribute field of a file entry for the UDF system in which the real time recording/reproduction information is stored, and the real time recording/reproduction information includes file indication information indicating that the real time files require real time recording/reproduction.

22. A recording medium, comprising:

real time files requiring real time recording/reproduction; and a file control information area of a universal disk format (UDF) system in which real time recording/reproduction information for ensuring real time recording/reproduction of the real time files is stored, wherein the file control information area includes an extended attribute field of a file entry for the UDF system in which the real time recording/reproduction information is stored, and the real time recording/reproduction information includes at least one of recording/reproduction bit rate information, information on a size of minimum contiguous storage blocks satisfying a condition in which playback time of a current data block is greater than a sum of a seek time and a read time of the current data block to be played back next, and information on a playback time for ensuring minimum contiguous storage.

23. A recording medium, comprising:

real time files requiring real time recording/reproduction; and a file control information area of a, universal disk format (UDF) system in which real time recording/reproduction information for ensuring real time recording/reproduction of the real time files is stored, wherein the file control information area includes a file identifier descriptor field of the UDF system in which the real time recording/reproduction information is stored, and the real time recording/reproduction information includes file indication information indicating that the real time files require real time recording/reproduction.

24. A recording medium, comprising:

real time files requiring real time recording/reproduction; and a file control information area of a universal disk format (UDF) system in which real time recording/reproduction information for ensuring real time recording/reproduction of the real time files is stored, wherein the file control information area includes a stream directory ICB (information control block) field for the UDF system in which the real time recording/reproduction information is stored, and the real time recording/reproduction information includes file indication information indicating that the real time files require real time recording/reproduction.

25. A recording medium, comprising:

real time files requiring real time recording/reproduction; and a file control information area of a universal disk format (UDF) system in which real time recording/reproduction information for ensuring real time recording/reproduction of the real time files is stored, wherein the file control information area includes a stream directory ICB (information control block) field for the UDF system in which the real time recording/reproduction information is stored, and the real time recording/reproduction information includes at least one of recording/reproduction bit rate information, information on minimum contiguous storage blocks satisfying a condition in which playback time of a current data block is greater than a sum of a seek time and a read time of a data block to be played back next, and information on a playback time for ensuring minimum contiguous storage.

26. A recording medium, comprising:

real time files requiring real time recording/reproduction; and a file control information area of a universal disk format (UDF) system in which real time recording/reproduction information for ensuring real time recording/reproduction of the real time files is stored, wherein the file control information area includes a file type field in an ICB TAG field of a file entry for the UDF system in which the real time recording/reproduction information is stored.

27. A recording medium, comprising:

real time files requiring real time recording/reproduction; and a file control information area of a universal disk format (UDF) system in which real time recording/reproduction information for ensuring real time recording/reproduction of the real time files is stored, wherein the file control information area includes a file flag field in an ICB TAG field of a file entry for the UDF system in which the real time recording/reproduction information is stored.

28. A recording medium comprising real time files requiring real time recording/reproduction, wherein realtime recording/reproduction information, which indicates whether real time recording/reproduction of the real time files is ensured, is stored in corresponding ones of the real time files.

29. A recording medium comprising real time files requiring real time recording/reproduction, wherein real time recording/reproduction information for ensuring real time recording/reproduction of the real time files is stored in corresponding ones of the real time files, wherein the real time recording/reproduction information is stored in a file "RTRW_TS.VOB" in each real time file, respectively, and having a real time rewritable (RTRW) format.

30. A recording medium comprising real time files requiring real time recording/reproduction, wherein real time recording/reproduction information for ensuring real time recording/reproduction of the real time files is stored in corresponding ones of the real time files, wherein the real time recording/reproduction information includes file indication information indicating that the corresponding real time files require real time recording/reproduction.

31. A recording medium comprising real time files requiring real time recording/reproduction, wherein real time recording/reproduction information for ensuring real time recording/reproduction of the real time files is stored in corresponding ones of the real time files, wherein the real time recording/reproduction information includes at least one of recording/reproduction bit rate information, information on minimum contiguous storage blocks satisfying a condition in which playback time of a current data block is greater than a sum of a seek time and a read time of a data block to be played back next, and information on a playback time for ensuring minimum contiguous storage.

32. A recording medium, comprising:

real time recording and/or reproduction information indicating that real time recording and/or reproduction is ensured;

wherein the real time recording and/or reproduction information is stored in a file type field in an information control block (ICB) TAG field of a file entry for a universal disk format (UDF) system.

33. A recording medium as claimed in claim 32, wherein the recording medium further comprises real time files requiring real time recording and/or reproduction.

34. A recording medium as claimed in claim 33, wherein the real time recording/reproduction information comprises file indication information indicating that the real time files require real time recording and/or reproduction.

35. A recording medium as claimed in claim 33, wherein the real time recording and/or reproduction information comprises at least one of recording/reproduction bit rate information, information on minimum contiguous storage blocks satisfying a condition in which a playback time of a current data block is greater than a sum of a seek time and a read time of a data block to be played back next, and information on a playback time for ensuring minimum contiguous storage.

* * * * *

UNITED STATES PATENT AND TRADEMARK OFFICE
CERTIFICATE OF CORRECTION

PATENT NO.    : 6,389,569 B1
DATED         : May 14, 2002
INVENTOR(S)   : Hyun-kwon Chung et al.

It is certified that error appears in the above-identified patent and that said Letters Patent is hereby corrected as shown below:

<u>Title page,</u>
Item [56], References Cited, U.S. PATENT DOCUMENTS, insert the following references which were omitted:

--    6,266,483    7/2001    Okada et al.
      6,259,858    7/2001    Ando et al.
      6,263,152    7/2001    Hisatomi et al. --

Amend the third reference (List continued on the next page.):

"PSTA XP-002113791, Optical Storage Technology Association Technical Information, Universal Disk Format Specification, Rev. 2.0 (Apr. 1998), pp. 1-125."
should be
-- OSTA XP-002113791, Optical Storage Technology Association Technical Information, Universal Disk Format Specification, Rev. 2.0 (Apr. 1998), pp. 1-125. --

<u>Column 15,</u>
Line 62, delete ",";

<u>Column 16,</u>
Line 63, change "realtime" to -- real time --.

Signed and Sealed this

Fifth Day of November, 2002

Attest:

JAMES E. ROGAN
Attesting Officer       Director of the United States Patent and Trademark Office